United States Patent
Tsuji et al.

(10) Patent No.: US 9,365,973 B2
(45) Date of Patent: Jun. 14, 2016

(54) METHOD FOR PRODUCING CELLULOSE NANOFIBERS

(75) Inventors: Shiho Tsuji, Tokyo (JP); Masahiko Fukazawa, Tokyo (JP); Shoichi Miyawaki, Tokyo (JP); Takeshi Iimori, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 1 day.

(21) Appl. No.: 14/348,791

(22) PCT Filed: Sep. 13, 2012

(86) PCT No.: PCT/JP2012/073437
§ 371 (c)(1),
(2), (4) Date: Mar. 31, 2014

(87) PCT Pub. No.: WO2013/047218
PCT Pub. Date: Apr. 4, 2013

(65) Prior Publication Data
US 2014/0238626 A1    Aug. 28, 2014

(30) Foreign Application Priority Data
Sep. 30, 2011   (JP) .................. 2011-216425

(51) Int. Cl.
| | |
|---|---|
| *D21C 9/00* | (2006.01) |
| *D21C 1/04* | (2006.01) |
| *D21C 1/02* | (2006.01) |
| *D21C 9/10* | (2006.01) |
| *C08B 15/02* | (2006.01) |
| *C08B 15/04* | (2006.01) |
| *D21C 3/18* | (2006.01) |
| *D21H 11/18* | (2006.01) |
| *D21H 11/20* | (2006.01) |
| *D21H 27/10* | (2006.01) |
| *D21C 3/02* | (2006.01) |

(52) U.S. Cl.
CPC . *D21C 1/02* (2013.01); *C08B 15/02* (2013.01); *C08B 15/04* (2013.01); *D21C 3/02* (2013.01); *D21C 3/18* (2013.01); *D21C 9/005* (2013.01); *D21C 9/007* (2013.01); *D21C 9/1036* (2013.01); *D21H 11/18* (2013.01); *D21H 11/20* (2013.01); *D21H 27/10* (2013.01)

(58) Field of Classification Search
CPC ....... D21C 9/1036; D21C 9/005; D21C 9/007
USPC .......................................... 162/72
See application file for complete search history.

(56) References Cited

U.S. PATENT DOCUMENTS

| | | | | |
|---|---|---|---|---|
| 4,483,743 | A | * | 11/1984 | Turbak et al. ............... 162/100 |
| 5,589,033 | A | * | 12/1996 | Tikka et al. ................. 162/84 |
| 2004/0074615 | A1 | * | 4/2004 | Nguyen ......................... 162/9 |
| 2010/0065236 | A1 | * | 3/2010 | Henriksson et al. ......... 162/174 |
| 2010/0282422 | A1 | | 11/2010 | Miyawaki et al. |
| 2011/0008638 | A1 | * | 1/2011 | Miyawaki et al. ......... 428/537.5 |
| 2013/0184380 | A1 | * | 7/2013 | Shimizu et al. ............. 524/37 |

FOREIGN PATENT DOCUMENTS

| | | | |
|---|---|---|---|
| EP | 1264845 A2 | * 12/2002 | ............. C08B 15/04 |
| EP | 2 826 792 A1 | 1/2015 | |
| JP | 2008-001728 | 1/2008 | |
| JP | 2009-298972 | 12/2009 | |
| JP | 2010275659 A | * 12/2010 | |
| JP | 2011-046793 | 3/2011 | |
| JP | 2011-074529 | 4/2011 | |
| JP | 2011-184475 | 9/2011 | |
| JP | 2011-195659 | 10/2011 | |
| JP | 2011-202010 | 10/2011 | |
| JP | 2012-111849 | 6/2012 | |
| WO | WO 2009/084566 A1 | 7/2009 | |
| WO | WO 2010/116826 A1 | 10/2010 | |
| WO | WO 2011/074301 A1 | 6/2011 | |
| WO | WO 2011/118746 A1 | 9/2011 | |
| WO | WO 2011/118748 A1 | 9/2011 | |
| WO | WO 2012/043103 A1 | 4/2012 | |

OTHER PUBLICATIONS

English Machine translation of JP 2010-275659 A, performed Sep. 3, 2014.*
Arndt, Suitable pulp grades for preparing nanofibrillated cellulose, Oct. 5, 2011, SUNPAP workshop.*
Moon et al., Cellulose nanomaterials review: structure, properties and nanocomposites, published online May 12, 2011, Chem. Soc. Rev., 40, p. 3941-3994.*
Sixta, Herbert, Handbook of Pulp, Jan. 30, 2008, chapter 11.*
Saito et al., Homogeneous Suspensions of Individualized Microfibrils from TEMPO-Catalyzed Oxidation of Native Cellulose, 2006. BioMacromolecules, vol. 7 No. 6, p. 1687-1691.*
International Search Report PCT/JP2012/073437 mailed Oct. 9, 2012.
Search Resort issued in EP App No. 12836977.4 dated Apr. 2, 2015.

* cited by examiner

*Primary Examiner* — Anthony Calandra
(74) *Attorney, Agent, or Firm* — Nixon & Vanderhye P.C.

(57) ABSTRACT

Provided is a method which is capable of producing a cellulose nanofiber dispersion liquid that has a low viscosity and excellent fluidity even at a high concentration, while exhibiting excellent transparency. In a method for producing cellulose nanofibers, wherein a cellulosic starting material is oxidized in water using an oxidant in the presence of an N-oxyl compound and a compound that is selected from the group consisting of a bromide, an iodide and a mixture thereof and the thus obtained oxidized cellulose is defibrated and dispersed, pulp which is obtained by carrying out kraft cooking after a hydrolysis process is used as the cellulosic starting material.

5 Claims, No Drawings

US 9,365,973 B2

METHOD FOR PRODUCING CELLULOSE NANOFIBERS

This application is the U.S. national phase of International Application No. PCT/JP2012/073437 filed 13 Sep. 2012 which designated the U.S. and claims priority to JP 2011-216425 filed 30 Sep. 2011, the entire contents of each of which are hereby incorporated by reference.

TECHNICAL FIELD

The present invention relates to a method for producing cellulose nanofibers, the method including: oxidizing a cellulosic starting material using an N-oxyl compound as a catalyst to produce oxidized cellulose, wherein the cellulosic starting material is pulp obtained by hydrolysis treatment and subsequent kraft cooking (hereinafter, also referred to as "dissolving pulp obtained by the kraft process" or "DKP"); and then defibrating and dispersing the oxidized cellulose.

BACKGROUND ART

When a cellulosic starting material is treated in the presence of a catalytic amount of 2,2,6,6-tetramethyl-1-piperidin-N-oxyradical (hereinafter "TEMPO") and sodium hypochlorite which is an inexpensive oxidizing agent, carboxyl groups can be introduced efficiently onto the cellulose microfibril surface. It is known that the cellulosic starting material onto which carboxyl groups have been introduced can be used to prepare a high-viscosity and transparent aqueous dispersion of cellulose nanofibers by treating the cellulosic starting material through a simple mechanical process in water using a mixer or the like (Non-patent Document 1).

Cellulose nanofibers are a novel water-dispersible biodegradable material. The properties of cellulose nanofibers can be modified using, as base points, carboxyl groups introduced onto the surface of the cellulose nanofibers. Further, since the cellulose nanofibers obtained by the method mentioned above are in the form of a dispersion liquid, they can be blended with various water-soluble polymers, can form a composite with an organic or inorganic pigment and can also be formed into a sheet or fiber. These characteristics of cellulose nanofibers are expected to be of help in using cellulose nanofibers in highly functional packaging materials, transparent organic substrate materials, highly functional fibers, separation membranes, regenerative biomaterials and the like and applying cellulose nanofibers to the development of novel and highly functional products.

In the production of cellulose nanofibers, kraft pulp (KP), sulfite pulp (SP), natural cellulose and the like have been so far proposed as cellulosic starting materials (Patent Document 1, Patent Document 2). Among them, sulfite pulp (SP) or kraft pulp (KP) for papermaking, which is highly reactive in oxidation reaction, inexpensive and easy to acquire as a starting material, is generally used. Meanwhile, no examples using pulp obtained by hydrolysis treatment and subsequent kraft cooking (DKP) as a cellulosic starting material have been reported.

Pulp obtained by hydrolysis treatment and subsequent kraft cooking (DKP) is one of dissolving pulps (DPs). Dissolving pulp (DP) is chemically highly purified pulp with high cellulose purity (Non-patent Document 2) and used chiefly as a starting material for viscose rayon, cellophane, fibers such as acetate and cupra, carboxymethyl cellulose (CMC) and the like, rather than for papermaking (Non-patent Document 3).

CITATION LIST

Patent Documents

Patent Document 1: JP 2008-001728 A
Patent Document 2: JP 2011-046793 A

Non-Patent Documents

Non-patent Document 1: Saito, T., et al., Cellulose Commun., 14 (2), 62 (2007)
Non-patent Document 2: JIS Handbook, 32, Paper and Pulp, Jan. 30, 2009, edited by the Japanese Standards Association
Non-patent Document 3: Practical Knowledge on Paper and Pulp (*Kami Parupu no Jissai Chishiki*) ($3^{rd}$ Edition), Aug. 20, 1983, edited by Toyo Keizai Inc.

SUMMARY OF INVENTION

Technical Problem

When sulfite pulp or kraft pulp, a papermaking pulp which has been conventionally reported, is used as a cellulosic starting material in the production of cellulose nanofibers, the viscosity of the resulting cellulose nanofiber dispersion liquid is high, which may cause problems.

For example, when the viscosity is too high, a problem is that since dispersion proceeds only around a mixer impeller during defibration and dispersion, it is impossible to obtain a homogeneous dispersion liquid and achieve high transparency. Further, when the viscosity of a cellulose nanofiber dispersion liquid is too high in the process of coating the dispersion liquid on a substrate to form a film thereon, a problem is that the dispersion liquid cannot be coated homogeneously. On the other hand, when the dispersion liquid is diluted for homogeneous coating, a problem is that coating and drying have to be repeated many times with poor efficiency until a desired film thickness is obtained. Moreover, in the case of mixing the dispersion liquid into a coating material containing a pigment and a binder and coating the mixture on paper or the like, when the viscosity of a cellulose nanofiber dispersion liquid is too high, a problem is that the dispersion liquid cannot be mixed evenly into the coating material.

Thus, it is desirable to produce a cellulose nanofiber dispersion liquid that has a low viscosity and high fluidity. The present invention aims to provide a cellulose nanofiber dispersion liquid that has a low viscosity and high fluidity even at a high concentration.

Solution to Problem

As a result of extensive and intensive studies to solve such problems in the prior art, the present inventors found that a cellulose nanofiber dispersion liquid that has a low viscosity and high fluidity even at a high concentration can be produced by using pulp obtained by hydrolysis treatment and subsequent kraft cooking (DKP) as a cellulosic starting material in a method for producing cellulose nanofibers comprising the steps of: oxidizing the cellulosic starting material in water using an oxidizing agent in the presence of an N-oxyl compound and a compound selected from the group consisting of a bromide, an iodide and a mixture thereof; and defibrating and dispersing the resulting oxidized cellulose. This finding led to the completion of the present invention. The cellulose nanofiber dispersion liquid produced in accordance with the present invention also has high transparency.

Advantageous Effects of Invention

In accordance with the present invention, a cellulose nanofiber dispersion liquid that has a low viscosity and high fluidity and high transparency even at a high concentration can be produced.

DESCRIPTION OF EMBODIMENTS

In the present invention, a cellulose nanofiber dispersion liquid is produced by the steps of: oxidizing pulp obtained by hydrolysis treatment and subsequent kraft cooking (sometimes also referred to as "dissolving pulp obtained by the kraft process" or "DKP") in water using an oxidizing agent in the presence of an N-oxyl compound (1) and a bromide, an iodide, or a mixture thereof (2) to give oxidized DKP; and defibrating and dispersing the oxidized DKP to produce nanofibers. In accordance with the present invention, a cellulose nanofiber dispersion liquid that has a low viscosity and high fluidity and high transparency even at a high concentration can be produced. Since the dispersion liquid has a low viscosity, electric consumption can be lower during the defibration and dispersion and a liquid having a higher concentration can be used for the defibration and dispersion, thus enabling the increase of the efficiency of cellulose nanofiber production.

(Cellulosic Starting Material: Pulp Obtained by Hydrolysis Treatment and Subsequent Kraft Cooking (DKP))

The present invention uses pulp obtained by hydrolysis treatment and subsequent kraft cooking (DKP) as a cellulosic starting material used for the preparation of oxidized cellulose. In the present invention, the "pulp obtained by hydrolysis treatment and subsequent kraft cooking (DKP)" means pulp obtainable by kraft cooking of a hydrolyzed plant material such as wood chip, kenaf, hemp, rice, bagasse or bamboo under general conditions. By the hydrolysis treatment of a plant material before kraft cooking, hemicellulose contained in the plant material is converted into water-soluble sugars and released and, thus, DKP obtained contains much less hemicellulose than that in common kraft pulp (KP) which has not been hydrolyzed. The hemicellulose content of common kraft pulp (KP) is about 10 to 30 mass %, whereas that of pulp obtained by hydrolysis treatment and subsequent kraft cooking (DKP) in the present invention is about 1 to 5 mass %, which varies with the type of plant materials used. Incidentally, the hemicellulose content of sulfite pulp is about 3 to 5 mass %.

The hemicellulose content of a cellulosic starting material may be determined as described below. After 300 mg of freeze-dried pulp is left to stand at room temperature for 2 hours in 3 mL of 72% sulfuric acid, the mixture is diluted to a sulfuric acid concentration of 2.5% and heated at 105° C. for 1 hour to cause hydrolysis reaction and give a monosaccharide solution. The obtained solution is diluted as appropriate and monosaccharides are quantified by ion chromatography (DX-500, a product of Dionex; Column: AS-7; Eluent: water; Flow rate: 1.1 ml/min). From the xylose and mannose contents of the solution obtained by the acid hydrolysis, the hemicellulose content is calculated by the following equation:

Hemicellulose content (%)=(xylose content (mg)×0.88+mannose content (mg)×0.9)/amount of pulp (mg)×100(%)

The type of a plant material used in the preparation of DKP is not particularly limited. Softwood or hardwood chip which is generally used for pulping, kenaf, hemp, rice, bagasse, bamboo or the like may be used.

DKP used in the present invention is characterized in that it has been hydrolyzed as a pretreatment performed before kraft cooking. One of hydrolysis processes is the direct steaming process. It is conjectured that by this process, high-temperature vapor blown into a plant material releases organic acids contained in the plant material, followed by hydrolysis caused by the action of those acids.

The conditions for the hydrolysis treatment are not particularly limited. For example, the treatment may be performed using an autoclave apparatus or the like to contact water or 2 mass % or less of a liquid-phase or vapor-phase mineral acid with a plant material such as wood chip and treat it at a temperature of 140 to 200° C., preferably 150 to 170° C., for 15 to 120 minutes, preferably 20 to 90 minutes. For this purpose, a mineral acid or sulfur dioxide may be added as a catalyst. The pH of the liquid phase or the vapor phase is about 2 to 5, preferably about 3 to 4. The ratio of the liquid phase or the vapor phase to the mass (bone dry weight) of a plant material (liquor ratio) is preferably about 0.5 to 5.0 L/kg, more preferably 1.2 to 3.5 L/kg, in terms of reaction efficiency.

It is preferred that after the hydrolysis treatment, a neutralization treatment is performed with a mixture of sodium hydroxide and sodium sulfide, a cooking white liquor or the like. The neutralization treatment can reduce alkali consumption in subsequent kraft cooking. As a neutralizing solution, for example, a solution of a mixture of sodium hydroxide, sodium sulfide and the like which have been mixed so that the solution has 5 to 20% active alkali (versus the mass of a plant material) and 15 to 35% sulfidity may be used in a liquor ratio of about 1.0 to 5.0 L/kg based on a plant material (bone dry weight). The neutralization treatment is preferably performed at 140 to 170° C. for about 10 to 120 minutes.

In the preparation of DKP used in the present invention, the conditions for the kraft cooking performed after the hydrolysis treatment are not particularly limited, but a method used in the preparation of common kraft pulp may be used. For example, in a digester, a cooking liquor (white liquor) containing caustic soda (sodium hydroxide) and sodium sulfide as main components may be added to a plant material to impregnate it with the cooking liquor generally at a temperature of about 110 to 120° C. and then the plant material may be retained at 160 to 170° C. for about 2 to 10 hours and cooked until the H-factor reaches about 350 to 2000. As a cooking liquor, for example, a solution of a mixture of sodium hydroxide, sodium sulfide and the like which have been mixed so that the solution has 5 to 30% active alkali (versus the mass of a plant material) and 20 to 40% sulfidity may be used in a liquor ratio of about 2.0 to 4.0 L/kg based on a plant material (bone dry weight).

The present invention is characterized by the use of a hydrolyzed plant material as a plant material in the kraft cooking.

Further, DKP obtained as described above may be bleached. The method of bleaching is not particularly limited, but may be a generally used method. For example, DKP arbitrarily delignified with oxygen in a common manner may be bleached in a sequence consisting of a combination of chlorination (C), chlorine dioxide bleaching (D), alkali extraction (E), hypochlorite bleaching (H), hydrogen peroxide bleaching (P), alkaline hydrogen peroxide treatment (Ep), alkaline hydrogen peroxide and oxygen treatment (Eop), ozone treatment (Z), chelate treatment (Q) and the like, such as D-E/P-D, C/D-E-H-D, Z-E-D-P, Z/D-Ep-D, Z/D-Ep-D-P, D-Ep-D, D-Ep-D-P, D-Ep-P-D, Z-Eop-D-D, Z/D-Eop-D or Z/D-Eop-D-E-D (The symbol "/" in the sequences means that the treatments shown in front of and behind the symbol "/" are performed continuously without washing.) Lignin, a colored substance in pulp, is dissolved off by kraft cooking, and the addition of that bleaching treatment enables the obtaining of cellulosic starting materials having higher brightness. It is desirable that the brightness of cellulosic starting materials should be 65% or higher or 80% or higher according to ISO 2470.

By using DKP as a cellulosic starting material, cellulose nanofibers having high fluidity and high transparency even at a high concentration can be obtained. As mentioned later in Examples, for example, sulfite pulp (SP) produced by sulfite cooking using sulfite has a low hemicellulose content (i.e., high cellulose purity) which is equivalent to the hemicellulose content of DKP, while a cellulose nanofiber dispersion liquid produced using DKP has a significantly lower viscosity than that produced using SP and also has higher transparency than that produced using SP. The obtaining of effects that are more advantageous from DKP than SP which has equivalent cellulose purity is an unexpected result. The reason such a result was obtained is unknown, but it is assumed that organic acids (e.g., acetic acid) released during hydrolysis treatment in the preparation of DKP influence the pulp in some way, or that the synergistic effect of hydrolysis treatment and kraft cooking makes some influence on the pulp. In this connection, since sulfite cooking in the preparation of sulfite pulp is performed under a strong acid condition of about pH 1 to 2, acetic acid or the like, which is released during the preparation of DKP, is not released during the preparation of SP.

(Oxidation of Cellulosic Starting Material)

In the present invention, oxidized cellulose is prepared by oxidizing DKP, a cellulosic starting material, in water using an oxidizing agent in the presence of an N-oxyl compound (1) and a compound selected from the group consisting of a bromide, an iodide and a mixture thereof (2).

The N-oxyl compound used in the present invention may be any compound as long as it promotes desired oxidation reaction. Examples of the N-oxyl compound used in the present invention include substances represented by the following general formula (Formula 1):

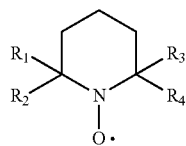

Formula 1 wherein $R_1$ to $R_4$, which may be the same or different, each represent an alkyl group having about 1 to 4 carbon atoms.

Among the substances represented by Formula 1, 2,2,6,6-tetramethyl-1-piperidin-oxyradical (hereinafter "TEMPO") is preferred. Also, N-oxyl compounds represented by any one of Formulas 2 to 5 below, i.e., 4-hydroxy TEMPO derivatives to which appropriate hydrophobicity has been imparted by etherification of the hydroxyl group of 4-hydroxy TEMPO with an alcohol or esterification with carboxylic acid or sulfonic acid, or 4-acetamide TEMPO to which appropriate hydrophobicity has been imparted by acetylation of the amino group of 4-amino TEMPO, are preferred since they are inexpensive and enable homogeneous oxidized cellulose to be obtained.

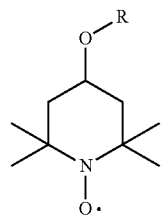

Formula 2

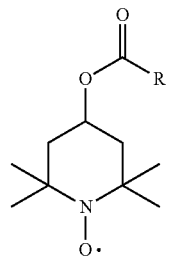

Formula 3

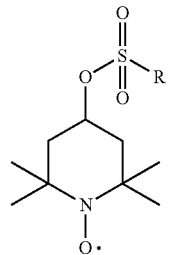

Formula 4

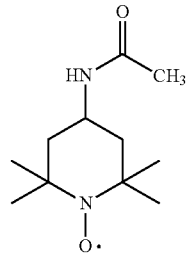

Formula 5

In Formulas 2 to 5, R is a straight or branched carbon chain having 4 or less carbon atoms.

Further, N-oxyl compounds represented by Formula 6 below, i.e., aza-adamantane type nitroxyl radicals, are preferred since they can oxidize a cellulosic starting material efficiently within a short reaction time.

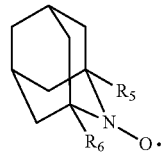

Formula 6

In Formula 6, $R_5$ and $R_6$, which may be the same or different, each represent a hydrogen atom or a $C_1$-$C_6$ straight or branched alkyl group.

The amount of an N-oxyl compound used may be a catalytic amount sufficient to oxidize a cellulosic starting material so that oxidized cellulose obtained can be formed into nanofibers. For example, the N-oxyl compound may be used in an amount of about 0.01 to 10 mmol, preferably about 0.01 to 1 mmol, more preferably about 0.05 to 0.5 mmol, per 1 g (bone dry weight) of a cellulosic starting material.

The bromide or iodide used in the oxidation of a cellulosic starting material may be a compound that can be dissociated in water and ionized, for example, an alkali metal bromide or an alkali metal iodide. The amount of the bromide or iodide used may be selected within a range that can promote the oxidation reaction. For example, the amount may be about 0.1 to 100 mmol, preferably about 0.1 to 10 mmol, more preferably about 0.5 to 5 mmol, per 1 g (bone dry weight) of a cellulosic starting material.

In the oxidation of a cellulosic starting material in the present invention, an oxidizing agent is used. The oxidizing agent may be any one as long as it can promote desired oxidation reaction, for example, a halogen, a hypohalogenous acid, a halogenous acid, a perhalogenic acid, or a salt thereof, a halogen oxide, or a peroxide. Among them, sodium hypochlorite, which is most widely used in industrial processes, inexpensive and less harmful to the environment, is suitable in terms of cost. The appropriate amount of an oxidizing agent used is, for example, about 0.5 to 500 mmol, preferably about 0.5 to 50 mmol, more preferably about 2.5 to 25 mmol, most preferably about 5 to 20 mmol, per 1 g (bone dry weight) of a cellulosic starting material.

The temperature applied during the oxidation reaction is not particularly limited, but may be a room temperature of about 15 to 30° C. The oxidation treatment using the aforementioned N-oxyl compound and the like in the present invention is characterized in that oxidation reaction proceeds smoothly even under mild conditions. As the reaction proceeds, carboxyl groups are generated in cellulose and hence, a decline in the pH of the reaction mixture is observed. To proceed with the oxidation reaction efficiently, it is desirable to maintain the pH of the reaction mixture at about pH 9 to 12, preferably about pH 10 to 11, by adding an alkaline solution such as an aqueous sodium hydroxide solution. The reaction time in the oxidation reaction may be set as appropriate according to the degree of the progression of oxidation and is not particularly limited, but is, for example, about 0.5 to 6 hours, preferably about 2 to 6 hours.

(Oxidized Cellulose)

The "oxidized cellulose" in the present invention can be obtained by the aforementioned oxidation reaction using DKP as a cellulosic starting material. The amount of the carboxyl groups contained in the oxidized cellulose is preferably 1.0 mmol/g or greater, more preferably 1.0 to 3.0 mmol/g, even more preferably 1.4 to 3.0 mmol/g, yet more preferably 1.5 to 2.0 mmol/g, based on the bone dry mass of the oxidized cellulose. The amount of the carboxyl groups may be set at a desired amount by a means such as the adjustment of oxidation reaction time, oxidation reaction temperature, pH during oxidation, or the amount of the N-oxyl compound, bromide, iodide or oxidizing agent added.

The amount of the carboxyl groups in the oxidized cellulose can be calculated through the following steps: preparing 60 ml of 0.5 mass % slurry of the oxidized cellulose, adjusting its pH to 2.5 with a 0.1M aqueous hydrochloric acid solution, then adding a 0.05N aqueous sodium hydroxide solution dropwise thereto while measuring the electrical conductivity until the pH reaches 11, and calculating the amount of carboxyl groups on the basis of the amount of sodium hydroxide (a) consumed in the stage of neutralization with weak acid where the electrical conductivity changes slowly, using the following formula:

$$\text{Amount of carboxyl groups [mmol/g pulp]} = a\,[\text{ml}] \times 0.05/\text{mass of oxidized cellulose [g]}$$

(Defibration and Dispersion)

In the present invention, the oxidized cellulose is subsequently defibrated and dispersed to prepare a cellulose nanofiber dispersion liquid. The type of an apparatus used for the defibration and dispersion is, for example, a high-speed rotary apparatus, a colloid mill type apparatus, a high pressure type apparatus, a roll mill type apparatus, or an ultrasound type apparatus. To efficiently produce a cellulose nanofiber dispersion liquid having high transparency and high fluidity, it is preferable to use a wet high pressure or ultrahigh pressure homogenizer that can perform dispersion process under a pressure condition of 50 MPa or higher, preferably 100 MPa or higher, more preferably 140 MPa or higher. The upper limit of the treatment pressure applied in the use of a homogenizer is not particularly limited, but is generally about 300 MPa.

In general, when a high concentration liquid is treated with a defibrating and dispersing apparatus, a problem is that the liquid viscosity may increase in the middle of the treatment, preventing homogeneous dispersion, or that the apparatus may stop. On the other hand, the present invention which uses DKP as a cellulosic starting material has the advantage of less tendency for such problems to occur even when a relatively high concentration liquid is used, since a cellulose nanofiber dispersion liquid having a low viscosity even at a high concentration can be produced in accordance with the present invention. For example, in the present invention, the concentration of oxidized cellulose slurry at the defibration and dispersion may be 1 to 10% (w/v), preferably 2 to 10% (w/v), more preferably 2 to 5% (w/v). The use of such a relatively high concentration liquid can increase the efficiency of cellulose nanofiber production.

(Cellulose Nanofibers)

Cellulose nanofibers are single microfibrils of cellulose with a width of about 2 to 5 nm and a length of about 1 to 5 μm, and an average fiber length of about 100 nm to 5 μm, which varies with conditions. In the present invention, "to form into nanofibers" means processing oxidized cellulose into cellulose nanofibers which are single microfibrils of cellulose with a width of about 2 to 5 nm, a length of about 1 to 5 μm and, in some cases, a length of about 100 nm to 5 μm.

The B-type viscosity (60 rpm, 20° C.) of the cellulose nanofiber dispersion liquid at a concentration of 1% (w/v) is preferably 30 mPa·s or lower, more preferably 20 mPa·s or lower, even more preferably 15 mPa·s or lower. The lower limit of the B-type viscosity is not particularly limited, but is generally about 1 mPa·s or higher.

The B-type viscosity of the cellulose nanofiber dispersion liquid in the present invention may be measured with a common B-type viscometer that is used by those skilled in the art and, for example, TV-10 viscometer of Told Sangyo Co., Ltd. may be used to measure the B-type viscosity under the conditions of 20° C. and 60 rpm.

The B-type viscosity of the cellulose nanofiber dispersion liquid is preferably 2000 mPa·s or lower because, for example, when the dispersion liquid having the B-type viscosity is coated on a substrate, a uniform coating layer of cellulose nanofibers can be formed on the substrate. The present invention has the advantage that a low viscosity of 2000 mPa·s or lower can be achieved even in a cellulose nanofiber dispersion liquid having a relatively high concentration of 4% (w/v). A high concentration cellulose nanofiber dispersion liquid having a low viscosity is superior in handleability and has, for example, the advantage that a somewhat thick and uniform coating layer can be prepared by one-time coating.

The transparency of the cellulose nanofiber dispersion liquid may be determined based on 660-nm light transmittance, using an ultraviolet and visible spectrophotometer. The light transmittance (660 nm) in the cellulose nanofiber dispersion liquid at a concentration of 0.1% (w/v) is preferably 95% or higher, more preferably 98% or higher.

Since the cellulose nanofibers produced in accordance with the present invention have high fluidity and high transparency, they can be suitably used for various applications such as packaging materials.

The amount of carboxyl groups in the cellulose nanofibers is desirably 1.0 mmol/g or greater. The amount of carboxyl groups in the cellulose nanofibers can be calculated through the following steps: preparing 60 ml of a 0.5% (w/v) dispersion liquid of the cellulose nanofibers, adjusting its pH to 2.5 with a 0.1M aqueous hydrochloric acid solution, then adding a 0.05N aqueous sodium hydroxide solution dropwise thereto while measuring the electrical conductivity until the pH reaches 11, and calculating the amount of carboxyl groups on the basis of the amount of sodium hydroxide (a) consumed in the stage of neutralization with weak acid where the electrical conductivity changes slowly, using the following formula:

Amount of carboxyl groups [mmol/g pulp]=$a$ [ml]× 0.05/mass of cellulose nanofibers (solid content) [g]

(Viscosity-Reducing Treatment)

In the present invention, the oxidized cellulose may be subjected to a viscosity-reducing treatment as described below before the defibration and dispersion treatment. The viscosity-reducing treatment is a treatment for cutting the cellulose chains of the oxidized cellulose into pieces of appropriate length (formation of the cellulose chains into short fibers) to reduce the viscosity. The viscosity-reducing treatment may be any treatment as long as it reduces the viscosity of the oxidized cellulose, and it is, for example, a treatment that irradiates oxidized cellulose with ultraviolet rays, a treatment that contacts oxidized cellulose with hydrogen peroxide and ozone to decompose the cellulose oxidatively, a treatment that hydrolyzes oxidized cellulose with an acid, a treatment that hydrolyzes oxidized cellulose under alkaline conditions, or a combination of these treatments.

(Viscosity-Reducing Treatment: Ultraviolet Irradiation)

When the oxidized cellulose is irradiated with ultraviolet rays in a viscosity-reducing treatment, the wavelength of the ultraviolet rays is preferably 100 to 400 nm, more preferably 100 to 300 nm. Especially, ultraviolet rays of wavelength 135 to 260 nm are preferred since they act directly on cellulose or hemicellulose to reduce its molecular weight and can form the cellulose chains of the oxidized cellulose into short fibers.

A light source for the ultraviolet irradiation may be one that irradiates light in the wavelength range of 100 to 400 nm. Specific examples include a xenon short arc lamp, an ultrahigh pressure mercury lamp, a high pressure mercury lamp, a low pressure mercury lamp, a deuterium lamp, a metal halide lamp, and the like. These light sources may be used singly or in combination of any two or more. In particular, when a combination of plural light sources having different wavelength characteristics is used, ultraviolet rays of different wavelengths are irradiated simultaneously, thereby increasing dissociation sites in cellulose chains or hemicellulose chains and promoting formation into short fibers.

A vessel in which the oxidized cellulose is placed during the ultraviolet irradiation may be, for example, a vessel made of hard glass when ultraviolet rays of a wavelength longer than 300 nm are used. On the other hand, when ultraviolet rays of a wavelength shorter than 300 nm are used, it is preferable to use a vessel made of quartz glass which transmits more ultraviolet rays. In such a vessel, the material of the part not involved in light transmission reaction may be an appropriate one selected from materials less likely to be deteriorated in reaction to the wavelength of ultraviolet rays used.

The concentration of the oxidized cellulose in the ultraviolet irradiation is preferably 0.1 mass % or higher since energy efficiency is increased. Further, the concentration is preferably 12 mass % or lower since the fluidity of a cellulosic starting material is good in an ultraviolet radiator and reaction efficiency is increased. Hence, the concentration is preferably within the range of 0.1 to 12 mass %. It is more preferably 0.5 to 5 mass %, even more preferably 1 to 3 mass %.

The temperature of the oxidized cellulose in the ultraviolet irradiation is preferably 20° C. or higher since the efficiency of photo-oxidation reaction is increased. Meanwhile, the temperature is preferably 95° C. or lower since there is no possible negative impact (e.g., the deterioration of the quality of the oxidized cellulose), no possibility for the pressure in a reactor apparatus to exceed atmospheric pressure, and no need to take pressure resistance into consideration in apparatus designing. Hence, the temperature is preferably within the range of 20 to 95° C. It is more preferably 20 to 80° C., even more preferably 20 to 50° C.

The pH in the ultraviolet irradiation is not particularly limited, but the neutral range, for example, about pH 6.0 to 8.0, is preferred in light of simplification of the process.

The level of the ultraviolet irradiation applied to the oxidized cellulose may be set arbitrarily by a means such as the adjustment of the residence time of the oxidized cellulose in an irradiation reactor or the adjustment of the energy amount of an irradiation light source. The amount of ultraviolet rays with which the oxidized cellulose is irradiated in an irradiation reactor may be controlled arbitrarily by, for example, adjusting the concentration of the oxidized cellulose in an irradiation apparatus by water dilution, or adjusting the concentration of the oxidized cellulose by blowing air or an inert gas such as nitrogen into the oxidized cellulose. The conditions such as residence time and concentration may be set as appropriate according to the desired quality of the oxidized cellulose irradiated (e.g., fiber length, polymerization degree of cellulose).

It is preferable to perform the ultraviolet irradiation treatment in the presence of an auxiliary agent such as oxygen, ozone or a peroxide (e.g., hydrogen peroxide, peracetic acid, sodium percarbonate, sodium perborate), since the efficiency of photo-oxidation reaction is increased.

In the case of irradiation with ultraviolet rays in the wavelength range of 135 to 242 nm, ozone is generated from air present generally in a vapor phase area near a light source. While air is continuously supplied to the area near the light source, ozone generated is continuously withdrawn and the ozone thus withdrawn is injected into the oxidized cellulose; by this process, ozone may be utilized as an auxiliary agent in photo-oxidation reaction without ozone supply from the outside of the system. Moreover, by oxygen supply to the vapor phase area near the light source, more ozone can be generated in the system, and the generated ozone can be used as an auxiliary agent in photo-oxidation reaction. In this manner, ozone generated secondarily in an ultraviolet irradiation reactor may be utilized.

The ultraviolet irradiation treatment may be repeated plural times. The number of the repetitions may be set as appropriate according to the desired quality of the oxidized cellulose and the relationship with bleaching treatment and the like. For example, the conditions are not particularly limited, but ultraviolet rays of 100 to 400 nm, preferably 135 to 260 nm, may be irradiated about 1 to 10 times, preferably about 2 to 5 times, for about 0.5 to 10 hours each time, preferably about 0.5 to 3 hours each time.

(Viscosity-Reducing Treatment: Oxidative Decomposition Using Hydrogen Peroxide and Ozone)

When the oxidized cellulose is decomposed oxidatively with hydrogen peroxide and ozone in a viscosity-reducing treatment, ozone may be generated by a known method in an ozone generator using air or oxygen as a starting material. The amount (mass) of ozone added is preferably 0.1 to 3 times larger than the bone dry mass of the oxidized cellulose. When the amount of ozone added is at least 0.1 time larger than the bone dry mass of the oxidized cellulose, the amorphous region of cellulose can be decomposed sufficiently, which enables the reduction of energy required for defibration and dispersion in the subsequent step. When the amount of ozone added is at most 3 times larger, excessive decomposition of cellulose can be inhibited and the decrease of the yield of the oxidized cellulose can be prevented. The amount of ozone added is more preferably 0.3 to 2.5 times larger than the bone dry mass of the oxidized cellulose, even more preferably 0.5 to 1.5 times larger.

The amount (mass) of hydrogen peroxide added is preferably 0.001 to 1.5 times larger than the bone dry mass of the oxidized cellulose. When hydrogen peroxide is used in an amount that is at least 0.001 time larger than the amount of the oxidized cellulose added, the synergistic action of ozone and hydrogen peroxide is exerted. For the decomposition of the oxidized cellulose, it is sufficient to use hydrogen peroxide in an amount that is at most about 1.5 times larger than the amount of the oxidized cellulose, and it is conjectured that the addition of a larger amount of hydrogen peroxide leads to cost increase. The amount of hydrogen peroxide added is more preferably 0.1 to 1.0 time larger than the bone dry mass of the oxidized cellulose.

In terms of reaction efficiency, it is preferred that the oxidative decomposition treatment with ozone and hydrogen peroxide is performed at pH 2 to 12, preferably pH 4 to 10, more preferably pH 6 to 8, at a temperature of 10 to 90° C., preferably 20 to 70° C., more preferably 30 to 50° C., for about 1 to 20 hours, preferably about 2 to 10 hours, more preferably about 3 to 6 hours.

An apparatus for the treatment with ozone and hydrogen peroxide may be one generally used by those skilled in the art. Such an apparatus may be, for example, a common reactor having a reaction chamber, a stirrer, a chemical injector, a heater, and a pH electrode.

After the treatment with ozone and hydrogen peroxide is completed, ozone and hydrogen peroxide that remain in an aqueous solution also act effectively in defibration and dispersion in the subsequent step and can promote the reduction of the viscosity of a cellulose nanofiber dispersion liquid.

The reason hydrogen peroxide and ozone can be used to reduce the viscosity of the oxidized cellulose efficiently is inferred as follows: on the surface of the oxidized cellulose produced by oxidation with an N-oxyl compound, carboxyl groups are localized and a hydrated layer is formed; hence, it is assumed that microscopic spaces not found in common pulp which are formed under the action of charge repulsive force between the carboxyl groups exist between the cellulose chains of the oxidized cellulose; it is also assumed that when the oxidized cellulose is treated with ozone and hydrogen peroxide, hydroxyl radicals which have high oxidizability are generated from the ozone and the hydrogen peroxide, oxidatively decompose the cellulose chains of the oxidized cellulose efficiently, finally form the oxidized cellulose into short fibers and reduce the viscosity.

(Viscosity-Reducing Treatment: Hydrolysis with Acid)

When an acid is added to the oxidized cellulose to hydrolyze its cellulose chains (acid hydrolysis) in a viscosity-reducing treatment, the acid may be a mineral acid such as sulfuric acid, hydrochloric acid, nitric acid or phosphoric acid.

The conditions for the acid hydrolysis treatment may be any conditions as long as they allow the acid to act on the amorphous region of cellulose, and they are not particularly limited. For example, the amount of the acid added is preferably 0.01 to 0.5 mass %, more preferably 0.1 to 0.5 mass %, based on the bone dry mass of the oxidized cellulose. The addition of the acid in an amount of 0.01 mass % or higher is preferred since hydrolysis of cellulose chains proceeds and the efficiency of the defibration and dispersion of the oxidized cellulose in the subsequent step is increased. The addition of the acid in an amount of 0.5 mass % or lower is also preferred since excessive hydrolysis of cellulose chains and the decrease of the yield of cellulose nanofibers can be prevented. The pH of the reaction mixture at the acid hydrolysis is 2.0 to 4.0, preferably 2.0 to 3.0. The acid hydrolysis treatment is preferably performed at a temperature of 70 to 120° C. for 1 to 10 hours in terms of the efficiency of the acid hydrolysis.

It is preferable to perform neutralization with an alkali such as sodium hydroxide after the acid hydrolysis treatment in terms of the efficiency of subsequent defibration and dispersion treatment.

The reason the viscosity of the oxidized cellulose can be reduced efficiently by the acid hydrolysis treatment is inferred as follows: on the surface of the oxidized cellulose produced by oxidation with an N-oxyl compound, carboxyl groups are localized and a hydrated layer is formed; hence, it is assumed that microscopic spaces not found in common pulp which are formed under the action of charge repulsive force between the carboxyl groups exist between the cellulose chains of the oxidized cellulose; it is also assumed that when the oxidized cellulose is hydrolyzed with an acid, the robust network of cellulose molecules is broken up, the specific surface area of the oxidized cellulose increases, the formation of the oxidized cellulose into short fibers is promoted, and the viscosity is reduced.

(Viscosity-Reducing Treatment: Hydrolysis with Alkali)

An auxiliary agent (e.g., an oxidizing agent, a reducing agent) that can be used in the hydrolysis of the oxidized cellulose under alkaline conditions in a viscosity-reducing treatment is not particularly limited, but may be an auxiliary agent having activity in an alkaline range, and such auxiliary agents may be used singly or in combination of two or more. The oxidizing agent may be oxygen, ozone, hydrogen peroxide, hypochlorite or the like. The reducing agent may be sodium boron hydride, hydrosulfite, sulfite or the like. In terms of treatment time and efficiency, the addition of the auxiliary agent in an amount within the range of 0.1 to 10% (w/v) based on the bone-dry oxidized cellulose is sufficient to cause desired reaction. The amount of the auxiliary agent is more preferably 0.3 to 5% (w/v), even more preferably 0.5 to 2% (w/v).

It is preferred that the hydrolysis treatment under alkaline conditions is performed at pH 8 to 14, preferably pH 9 to 13, more preferably pH 10 to 12. The alkali to be used is not particularly limited as long as it is water-soluble, but sodium hydroxide is best in light of production cost. It is preferred that the hydrolysis treatment is performed at a temperature of 40 to 120° C., preferably 50 to 100° C., more preferably 60 to 90° C., for about 0.5 to 24 hours, preferably about 1 to 10 hours, more preferably about 2 to 6 hours, in terms of reaction efficiency. The concentration of the oxidized cellulose is preferably within the range of 1 to 20% (w/v) in terms of hydrolysis efficiency. The concentration is more preferably 3 to 15% (w/v), even more preferably 5 to 10% (w/v).

The reason the viscosity of the oxidized cellulose can be reduced efficiently by the hydrolysis under alkaline conditions is inferred as follows: assumably, carboxyl groups are dispersed in the amorphous region of the oxidized cellulose produced by oxidation with an N-oxyl compound, the hydrogen at the $C_6$-position at which a carboxyl group exists is withdrawn by a hydroxide ion under alkaline conditions, and cleavage reaction of glycoside bonds due to β-elimination proceeds. It is also assumed that this promotes the formation of the oxidized cellulose into short fibers and reduces the viscosity.

(Purification Treatment)

In the present invention, DKP or bleached DKP may be purified with an enzyme, an alkali or an oxidizing chemical before the preparation of oxidized cellulose. By using a purified cellulosic starting material, a cellulose nanofiber dispersion liquid having a lower viscosity can be produced. The purification treatment may be performed once or plural times, and also may be combined with a different treatment. For example, after a xylanase treatment, an alkali treatment or a combination of these two treatments is performed to remove hemicellulose, a treatment with an oxidizing agent, a cellulase treatment or a combination of these treatments is performed to enable the decrease of the polymerization degree of cellulose contained in a cellulosic starting material. It is preferable to combine a plurality of treatments in this manner because such combination results in high treatment efficiency. The hemicellulose content of the purified cellulosic starting material is preferably 10 mass % or lower, more preferably 5 mass % or lower, even more preferably 3 mass % or lower.

(Purification Treatment: Enzyme Treatment)

In an enzyme treatment in a purification treatment, cellulase or hemicellulase may be used. The cellulase or hemicellulase is not particularly limited, but may be one derived from a cellulase-producing filamentous fungus, a bacterium, an actinomycete or a basidiomycete or one produced by genetic engineering such as genetic recombination or cell fusion, and these enzymes may be used singly or in combination of two or more. Alternatively, commercially available cellulase or hemicellulase may be used. Commercially available cellulase may be, for example, Novozym 476 (registered trademark) of Novozymes Japan, Ltd., Cellulase AP3 of Amano Enzyme Inc., Cellulase Onozuka RS of Yakult Pharmaceutical Industry Co., Ltd., Optimase CX 40L (registered trademark) of Genencor Kyowa Co., Ltd., GODO-TCL of Godo Shusei Co., Ltd., Cellulase XL-522 of Nagase ChemteX Corporation, or Enzylon CM of Rakuto Kasei Industrial Co., Ltd. Commercially available hemicellulase may be Pulpzyme (registered trademark) of Novozymes Japan, Ltd., Hemicellulase Amano 90 (registered trademark) of Amano Enzyme Inc., Sumizyme X (registered trademark) of Shinnihon Chemicals Corporation, or the like.

The addition of an enzyme in an amount of 0.001 mass % or more based on a bone-dry cellulosic starting material is sufficient to cause desired enzyme reaction in terms of treatment time and efficiency. The addition of an enzyme in an amount of 10 mass % or less is preferred since excessive hydrolysis of cellulose can be inhibited and the decrease of yield can be prevented. Hence, the amount of an enzyme added is preferably 0.001 to 10 mass % based on a bone-dry cellulosic starting material. The amount is more preferably 0.01 to 5 mass %, even more preferably 0.05 to 2 mass %. As used herein, "the amount of an enzyme" means the dry solid content of an aqueous enzyme solution. In the enzyme treatment, sufficient stirring and homogeneous reaction are desirable in terms of reaction efficiency and the homogeneity of a cellulosic starting material after reaction. In the present invention, a cellulosic starting material treated with an enzyme may be irradiated with ultraviolet rays and/or heated to thereby deactivate the enzyme, as needed.

When an enzyme is deactivated by heating, the treatment may be performed using a pressurized autoclave or the like at a temperature of 90 to 120° C. for about 5 to 30 minutes, according to the heat resistance of the enzyme.

When an enzyme is deactivated by ultraviolet irradiation, the wavelength of ultraviolet rays used is preferably 100 to 400 nm, more preferably 100 to 300 nm Especially, ultraviolet rays of wavelength 135 to 260 nm are preferred in terms of enzyme deactivation as well as the reduction of the viscosity of a cellulosic starting material, since the ultraviolet rays act on not only the enzyme but also cellulose or hemicellulose to promote the formation of the cellulosic starting material into short fibers.

A light source for the ultraviolet irradiation may be one that irradiates light in the wavelength range of 100 to 400 nm. Specific examples include a xenon short arc lamp, an ultrahigh pressure mercury lamp, a high pressure mercury lamp, a low pressure mercury lamp, a deuterium lamp, a metal halide lamp, and the like. These light sources may be used singly or in combination of any two or more. The use of a combination of plural light sources having different wavelength characteristics is preferred since ultraviolet rays of different wavelengths are irradiated simultaneously, thereby increasing dissociation sites in enzyme, cellulose chains and hemicellulose chains and promoting the deactivation of the enzyme and the formation of the cellulose chains into short fibers.

In the enzyme deactivation by ultraviolet irradiation, it is preferable to add an auxiliary agent such as oxygen, ozone or a peroxide (e.g., hydrogen peroxide, peracetic acid, sodium percarbonate, sodium perborate), since the efficiency of photo-oxidation reaction with ultraviolet rays can be increased.

(Purification Treatment: Alkali Treatment)

In an alkali treatment in a purification treatment, an alkaline agent may be used. The alkaline agent is not limited as long as it is water-soluble, and examples include inorganic alkalis such as sodium hydroxide, potassium hydroxide, calcium hydroxide, and sodium carbonate, organic alkalis such as tetramethyl ammonium hydroxide and tetraethyl ammonium hydroxide, and the like. Among them, sodium hydroxide, which is a relatively inexpensive and general-purpose alkaline agent, is preferred. An aqueous solution containing plural alkalis and other components, such as white liquor or green liquor generated in a pulp mill, may also be used.

The hydroxide ion concentration in the alkali treatment may be 0.75 to 3.75 mol/L, preferably 1.25 to 2.5 mol/L. When the hydroxide ion concentration is 0.75 mol/L or higher, hemicellulose can be well removed. When the hydroxide ion concentration exceeds 3.75 mol/L, excessive alkali causes excessive formation of a cellulosic starting material into short fibers, thus possibly causing the problem of difficult washing of oxidized cellulose after oxidation treatment and the problem of the decreased yield of cellulose nanofibers because the majority of the cellulosic starting material is mercerized, changed into polycellouronic acid during subsequent oxidation treatment and dissolved.

The alkali treatment may be performed under atmospheric pressure, under pressure or under reduced pressure. The treatment temperature is 0 to 100° C., preferably 10 to 60° C., more preferably 20 to 40° C., and the treatment time is 5 minutes to 24 hours, preferably 15 minutes to 12 hours, more preferably 30 minutes to 6 hours. The concentration (solid content) of a cellulosic starting material at the alkali treatment is within the range of 0.1 to 50 mass %, preferably 1 to 30 mass %, more preferably 2 to 20 mass %. Hemicellulose removal effects and structural changes including the molecular weight reduction of cellulose are determined by the alkali concentration, reaction temperature and reaction time at the alkali treatment. By changing these conditions as appropriate, a cellulosic starting material having a desired degree of purification can be obtained.

(Purification Treatment: Treatment with Oxidizing Chemical)

The type of an oxidizing chemical used in a treatment with the oxidizing chemical as a part of a purification treatment is not particularly limited, but sodium hypochlorite is suitable in terms of its price and effects. The addition of an oxidizing chemical in an amount within the range of 0.1 to 10 mass % based on a bone-dry cellulosic starting material is sufficient to cause desired reaction in terms of treatment time and efficiency. The amount is more preferably 0.3 to 5 mass %, even more preferably 0.5 to 2 mass %. The reaction temperature is preferably 50 to 80° C., more preferably 55 to 75° C., even more preferably 55 to 65° C., and the treatment time is preferably 5 to 240 minutes, more preferably 15 to 180 minutes, even more preferably 30 to 150 minutes. The concentration (solid content) of a cellulosic starting material at the treatment with an oxidizing chemical is within the range of 0.1 to 50 mass %, preferably 1 to 30 mass %, more preferably 2 to 20 mass %.

EXAMPLES

The present invention will be described in more detail below with reference to Examples, but the invention is not limited thereto.

Example 1

Into a 2.4 L-volume rotary autoclave, 300 g (bone dry weight) of hardwood chip was put and water was added thereto to adjust the liquor ratio to 2 L/kg. The mixture was retained at 170° C. for 30 minutes to perform hydrolysis treatment and then neutralized with a neutralizing solution at 155° C. for 15 minutes. The neutralizing solution was prepared by mixing sodium hydroxide and sodium sulfide so that the solution had 11% active alkali (versus the mass of the chip), 25% sulfidity and a liquor ratio of 2.5 L/kg. After the neutralization treatment, liquid was withdrawn from the autoclave, a cooking liquor (which was prepared by mixing sodium hydroxide and sodium sulfide so that the cooking liquor had 9% active alkali (versus the mass of the chip), 25% sulfidity and a liquor ratio of 2.5 L/kg) was added, and a cooking process was performed at 160° C. until the H-factor reached 830 (preparation of DKP).

The cooked unbleached pulp was delignified with oxygen and then bleached in the sequence of D0-E/P-D1 as ECF bleaching. Oxygen delignification was performed with Quantum high intensity mini mixer, and after the reaction, the pulp was well washed. The bleaching was all performed in a water bath, using pulp slurry (pulp conc. 10%) in a plastic bag. After the bleaching, fresh water was used for dilution to a pulp concentration of 1.5% and water obtained by pressing was used for several-time washing. In the subsequent bleaching stage, the water obtained by pressing in the previous stage was used to adjust the pulp concentration to 15%, and then bleaching was performed with a predetermined amount of a bleaching chemical to adjust the pulp concentration to 10%. It is to be noted that drainage water produced in the previous oxygen delignification stage was not introduced in only the D0 stage. Oxygen delignification: Pulp conc. 10%; Amount of sodium hydroxide added 4.0%; Initial oxygen pressure 6.0 kg/cm$^2$; Reaction temperature 98° C.; Reaction time 60 min. D0: Pulp conc. 10%; Amount of chlorine dioxide added 10 kg/ADTP (Air Dried Tons Pulp, 1 ton of air-dried pulp) (corresponding to 0.9 ton of bone-dry pulp); Reaction temperature 55° C.; Reaction time 40 min. E/P: Pulp conc. 10%; Amount of sodium hydroxide added 7.0 kg/ADTP; Amount of hydrogen peroxide added 2.7 g/ADTP; Reaction temperature 65° C.; Reaction time 90 min. D1: Pulp conc. 10%; Amount of chlorine dioxide added 1.5 kg/ADTP; Reaction temperature 65° C.; Reaction time 180 min. By the bleaching treatment described above, unbeaten bleached pulp (brightness: 86%) was obtained.

The hemicellulose content of the obtained pulp was determined to be 3% in the following manner:

After 300 mg of freeze-dried pulp was left to stand at room temperature for 2 hours in 3 mL of 72% sulfuric acid, the mixture was diluted to a sulfuric acid concentration of 2.5% and heated at 105° C. for 1 hour to cause hydrolysis reaction and give a monosaccharide solution. The obtained solution was diluted as appropriate and monosaccharides were quantified by ion chromatography (DX-500, a product of Dionex; Column: AS-7; Eluent: water; Flow rate: 1.1 ml/min). From the xylose and mannose contents of the solution obtained by the acid hydrolysis, the hemicellulose content was calculated by the following equation:

Hemicellulose content (%)=(xylose content (mg)× 0.88+mannose content (mg)×0.9)/amount of pulp (mg)×100(%)

5 g (bone dry weight) of the aforementioned unbeaten bleached pulp was added to 500 ml of an aqueous solution obtained by dissolving 78 mg (0.5 mmol) of TEMPO (Sigma Aldrich) and 754 mg (7.4 mmol) of sodium bromide, and the mixture was stirred until the pulp was evenly dispersed. To the reaction system was added 16 ml of a 2M aqueous sodium hypochlorite solution, and then the pH was adjusted to 10.3 with a 0.5N aqueous hydrochloric acid solution to initiate oxidation reaction (oxidation treatment). While the pH of the system decreased during the reaction, a 0.5N aqueous sodium hydroxide solution was successively added to adjust the pH to 10. After the mixture was reacted for 2 hours, it was passed through a glass filter and well washed with water to give oxidized cellulose.

The amount of carboxyl groups in the obtained oxidized cellulose was determined to be 1.87 mmol/g in the following manner:

60 ml of 0.5 mass % slurry of the oxidized cellulose was prepared, its pH was adjusted to 2.5 with a 0.1M aqueous hydrochloric acid solution, then a 0.05N aqueous sodium hydroxide solution was added dropwise thereto while the electrical conductivity was being measured until the pH reached 11, and the amount of carboxyl groups was calculated on the basis of the amount of sodium hydroxide (a) consumed in the stage of neutralization with weak acid where the electrical conductivity changed slowly, using the following formula:

Amount of carboxyl groups [mmol/g pulp]=$a$ [ml]× 0.05/mass of oxidized cellulose [g]

500 ml of 1% (w/v) oxidized cellulose slurry obtained was treated 10 times with an ultrahigh pressure homogenizer (20° C., 140 MPa) (defibration and dispersion treatment) to give a transparent gelatinous cellulose nanofiber dispersion liquid.

The B-type viscosity (60 rpm, 20° C.) of the obtained 1.0% (w/v) cellulose nanofiber dispersion liquid was measured with TV-10 viscometer (Told Sangyo Co., Ltd.) Also, the transparency (660-nm light transmittance) of a 0.1% (w/v) cellulose nanofiber dispersion liquid obtained was measured with UV-265FS (Shimadzu Corporation), which is a UV-VIS spectrophotometer. The result is shown in Table 1.

Example 2

Into a 2.4 L-volume rotary autoclave, 300 g (bone dry weight) of softwood chip was put and water was added thereto to adjust the liquor ratio to 3.2 L/kg. The mixture was retained at 170° C. for 30 minutes to perform hydrolysis treatment and then neutralized with a neutralizing solution at 155° C. for 15 minutes. The neutralizing solution was prepared by mixing sodium hydroxide and sodium sulfide so that the solution had 13% active alkali (versus the mass of the chip), 25% sulfidity and a liquor ratio of 3.2 L/kg. After the neutralization treatment, liquid was withdrawn from the autoclave, a cooking liquor (which was prepared by mixing sodium hydroxide and sodium sulfide so that the cooking liquor had 11% active alkali (versus the mass of the chip), 25% sulfidity and a liquor ratio of 3.2 L/kg) was added, and a cooking process was performed at 170° C. until the H-factor reached 1800 (preparation of DKP).

The cooked unbleached pulp was delignified with oxygen and then bleached in the sequence of D0-E/P-D1 as ECF bleaching. Oxygen delignification was performed with Quantum high intensity mini mixer, and after the reaction, the pulp was well washed. The bleaching was all performed in a water bath, using pulp slurry (pulp conc. 10%) in a plastic bag. After the bleaching, fresh water was used for dilution to a pulp concentration of 1.5% and water obtained by pressing was used for several-time washing. In the subsequent bleaching stage, the water obtained by pressing in the previous stage was used to adjust the pulp concentration to 15%, and then bleaching was performed with a predetermined amount of a bleaching chemical to adjust the pulp concentration to 10%. It is to be noted that drainage water produced in the previous oxygen delignification stage was not introduced in only the D0 stage. Oxygen delignification: Pulp conc. 10%; Amount of sodium hydroxide added 5%; Initial oxygen pressure 6.0 kg/cm$^2$; Reaction temperature 98° C.; Reaction time 60 min. D0: Pulp conc. 10%; Amount of chlorine dioxide added 6.0 kg/ADTP; Reaction temperature 55° C.; Reaction time 40 min. E/P: Pulp conc. 10%; Amount of sodium hydroxide added 9.0 kg/ADTP; Amount of hydrogen peroxide added 5.0 kg/ADTP; Reaction temperature 65° C.; Reaction time 90 min. D1: Pulp conc. 10%; Amount of chlorine dioxide added 3.0 kg/ADTP; Reaction temperature 65° C.; Reaction time 180 min. By these treatments, unbeaten bleached pulp (brightness: 84%) was obtained. 5 g (bone dry weight) of the obtained pulp was used to give a cellulose nanofiber dispersion liquid in the same manner as in Example 1. The hemicellulose content of the starting material pulp, the amount of carboxyl groups in the oxidized cellulose, the B-type viscosity of the cellulose nanofiber (CNF) dispersion liquid, and the transparency of the dispersion liquid were determined in the same manner as in Example 1. The result is shown in Table 1.

Example 3

Oxidized cellulose was obtained in the same manner as in Example 1. Subsequently, to 5% (w/v) slurry of the oxidized cellulose was added hydrogen peroxide in a concentration of 1% (w/v) based on the oxidized cellulose, and the pH was adjusted to 12 with 1M sodium hydroxide. After this slurry was treated at 80° C. for 2 hours, it was passed through a glass filter and well washed with water (viscosity-reducing treatment: hydrolysis with alkali). The 2% (w/v) oxidized cellulose slurry obtained which had been subjected to the viscosity-reducing treatment was treated 10 times with an ultrahigh pressure homogenizer (20° C., 140 MPa) to give a transparent gelatinous cellulose nanofiber dispersion liquid. The hemicellulose content of the starting material pulp, the amount of carboxyl groups in the oxidized cellulose, the B-type viscosity of the cellulose nanofiber (CNF) dispersion liquid, and the transparency of the dispersion liquid were determined in the same manner as in Example 1. The result is shown in Table 1.

Example 4

Oxidized cellulose that had been subjected to a viscosity-reducing treatment was obtained in the same manner as in Example 3. 1 L of 4% (w/v) slurry of the obtained oxidized cellulose was treated 10 times with an ultrahigh pressure homogenizer (20° C., 140 MPa) to give a transparent gelatinous cellulose nanofiber dispersion liquid. The B-type viscosity (60 rpm, 20° C.) of the obtained 4% (w/v) cellulose nanofiber dispersion liquid was measured in the same manner as in Example 3. The result is shown in Table 1.

Example 5

Unbeaten bleached hardwood pulp (bleached hardwood DKP) was obtained in the same manner as in Example 1. 20 g (bone dry weight) of the obtained pulp was added to an aqueous sodium hydroxide solution having a hydroxide ion concentration of 2.5 mol/L so that the pulp concentration was 10 mass %. After the mixture was stirred at room temperature (20° C.) for 1 hour, it was neutralized with an acid and washed with water (purification treatment: alkali treatment). Subsequently, the resulting purified hardwood DKP was oxidized in the same manner as in Example 1 to give oxidized cellulose (oxidation treatment). The obtained oxidized cellulose was hydrolyzed with an alkali in the same manner as in Example 3 (viscosity-reducing treatment: hydrolysis with alkali). The 4% (w/v) oxidized cellulose slurry obtained which had been subjected to the viscosity-reducing treatment was treated 10 times with an ultrahigh pressure homogenizer (20° C., 140 MPa) to give a transparent gelatinous cellulose nanofiber dispersion liquid. The B-type viscosity (60 rpm, 20° C.) of the obtained 4% (w/v) cellulose nanofiber dispersion liquid was measured in the same manner as in Example 3. The result is shown in Table 1.

Comparative Example 1

Bleached pulp (brightness: 85%) was obtained by cooking and bleaching hardwood chip in the same manner as in Example 1 except that the hardwood chip was neither hydrolyzed nor neutralized and that the composition of a cooking liquor used was set at 20% active alkali (versus the mass of the chip), 25% sulfidity and a liquor ratio of 2.5 L/kg (preparation of bleached KP). The pulp was used to give a cellulose nanofiber dispersion liquid in the same manner as in Example 1. The hemicellulose content of the starting material pulp, the amount of carboxyl groups in the oxidized cellulose, the B-type viscosity of the cellulose nanofiber (CNF) dispersion liquid, and the transparency of the dispersion liquid were determined in the same manner as in Example 1. The result is shown in Table 1.

Comparative Example 2

Bleached pulp (brightness: 83%) was obtained by cooking and bleaching in the same manner as in Example 2 except that neither hydrolysis nor neutralization was performed and that the composition of a cooking liquor used was set at 24% active alkali (versus the mass of the chip), 25% sulfidity and a liquor ratio of 3.2 L/kg (preparation of bleached KP). The pulp was used to give a cellulose nanofiber dispersion liquid in the same manner as in Example 1. The hemicellulose content of the starting material pulp, the amount of carboxyl groups in the oxidized cellulose, the B-type viscosity of the cellulose nanofiber (CNF) dispersion liquid, and the transparency of the dispersion liquid were determined in the same manner as in Example 1. The result is shown in Table 1.

Comparative Example 3

5 g (bone dry weight) of commercially available cooked, bleached hardwood sulfite pulp was used to give a cellulose nanofiber dispersion liquid in the same manner as in Example 1. The hemicellulose content of the starting material pulp, the amount of carboxyl groups in the oxidized cellulose, the B-type viscosity of the cellulose nanofiber (CNF) dispersion liquid, and the transparency of the dispersion liquid were determined in the same manner as in Example 1. The result is shown in Table 1.

Comparative Example 4

Commercially available cooked, bleached hardwood sulfite pulp was used to give oxidized cellulose in the same manner as in Example 1 and, subsequently, a viscosity-reducing treatment was performed in the same manner as in Example 3. 1 L of the 2% (w/v) oxidized cellulose slurry obtained which had been subjected to the viscosity-reducing treatment was treated 10 times with an ultrahigh pressure homogenizer (20° C., 140 MPa) to give a transparent gelatinous cellulose nanofiber dispersion liquid. The B-type viscosity (60 rpm, 20° C.) of the obtained 2% (w/v) cellulose nanofiber dispersion liquid was measured with TV-10 viscometer (Toki Sangyo Co., Ltd.) Further, the hemicellulose content of the starting material pulp, the amount of carboxyl groups in the oxidized cellulose, and the transparency of the cellulose nanofiber dispersion liquid were determined in the same manner as in Example 1. The result is shown in Table 1.

Comparative Example 5

Oxidized cellulose that was subjected to a viscosity-reducing treatment was obtained in the same manner as in Comparative Example 4. 1 L of 3% (w/v) slurry of the obtained oxidized cellulose was treated 10 times with an ultrahigh pressure homogenizer (20° C., 140 MPa), and the B-type viscosity (60 rpm, 20° C.) of the obtained 3% (w/v) dispersion liquid was measured in the same manner as in Comparative Example 4. The result is shown in Table 1.

Comparative Example 6

Oxidized cellulose that was subjected to a viscosity-reducing treatment was obtained in the same manner as in Comparative Example 4. The treatment of 1 L of 4% (w/v) slurry of the obtained oxidized cellulose was tried with an ultrahigh pressure homogenizer (20° C., 140 MPa), but the viscosity of the slurry markedly increased during the treatment, changing the slurry into a non-flowable gelatinous solid and allowing no further dispersion. Consequently, no homogeneous cellulose nanofiber dispersion liquid could be obtained.

Comparative Example 7

Bleached hardwood kraft pulp was obtained in the same manner as in Comparative Example 1. Subsequently, the pulp concentration was adjusted to 10% (w/v), 10 mass % of sulfuric acid was added, and the mixture was treated at 100° C. for 2 hours (preparation of acid-hydrolyzed bleached KP, 80% yield). The obtained pulp was used to give a cellulose nanofiber dispersion liquid in the same manner as in Example 1 and the properties were determined in the same manner as in Example 1. The result is shown in Table 1.

Comparative Example 8

Commercially available cooked, bleached softwood sulfite pulp was used to give a cellulose nanofiber dispersion liquid in the same manner as in Example 1 and the properties were determined in the same manner as in Example 1. The result is shown in Table 1.

TABLE 1

| | Starting material pulp | Purification treatment | Viscosity-reducing treatment | Hemicellulose content of starting material pulp (%) | Amount of carboxyl groups in oxidized cellulose (mmol/g) | Conc. of oxidized cellulose slurry at defibration and dispersion (% (w/v)) | Transparency of 0.1% (w/v) CNF dispersion liquid (%) | Conc. of dispersion liquid (% (w/v)) | Viscosity (mPa·s) |
|---|---|---|---|---|---|---|---|---|---|
| Ex. 1 | Bleached hardwood DKP | x | x | 3 | 1.87 | 1 | 98.6 | 1 | 18 |
| Ex. 2 | Bleached softwood DKP | x | x | 2.9 | 1.76 | 1 | 99 | 1 | 14 |
| Ex. 3 | Bleached hardwood DKP | x | Alkali hydrolysis | 3 | 1.87 | 2 | 98.6 | 1 | 6 |
| Ex. 4 | Bleached hardwood DKP | x | Alkali hydrolysis | 3 | 1.87 | 4 | 98.6 | 4 | 1400 |
| Ex. 5 | Bleached hardwood DKP | Alkali treatment | Alkali hydrolysis | 2.7 | 1.94 | 4 | 98.8 | 4 | 980 |

TABLE 1-continued

| | Starting material pulp | Purification treatment | Viscosity-reducing treatment | Hemicellulose content of starting material pulp (%) | Amount of carboxyl groups in oxidized cellulose (mmol/g) | Conc. of oxidized cellulose slurry at defibration and dispersion (% (w/v)) | Transparency of 0.1% (w/v) CNF dispersion liquid (%) | Conc. of dispersion liquid (% (w/v)) | Viscosity (mPa·s) |
|---|---|---|---|---|---|---|---|---|---|
| Comp. Ex. 1 | Bleached hardwood KP | x | x | 19.2 | 1.64 | 1 | 97.2 | 1 | 270 |
| Comp. Ex. 2 | Bleached softwood KP | x | x | 14.8 | 1.62 | 1 | 98.8 | 1 | 92 |
| Comp. Ex. 3 | Bleached hardwood SP | x | x | 3.2 | 1.75 | 1 | 97.5 | 1 | 94 |
| Comp. Ex. 4 | Bleached hardwood SP | x | Alkali hydrolysis | 3.2 | 1.82 | 2 | 97.8 | 2 | 990 |
| Comp. Ex. 5 | Bleached hardwood SP | x | Alkali hydrolysis | 3.2 | 1.82 | 3 | 97.8 | 3 | 6000 |
| Comp. Ex. 6 | Bleached hardwood SP | x | Alkali hydrolysis | 3.2 | 1.82 | 4 | No CNF dispersion liquid could be obtained because of marked increase of viscosity during defibration and dispersion. | | |
| Comp. Ex. 7 | Acid-hydrolyzed bleached hardwood KP | x | x | 6.4 | 1.51 | 1 | 96.1 | 1 | 455 |
| Comp. Ex. 8 | Bleached softwood SP | x | x | 5.4 | 1.78 | 1 | 98.1 | 1 | 81 |

The invention claimed is:

1. A method for producing cellulose nanofibers, the method comprising the steps of:
   (A) subjecting pulp to hydrolysis treatment and subsequent kraft cooking to prepare dissolving kraft pulp;
   (B) oxidizing the dissolving kraft pulp in water using an oxidizing agent in the presence of (1) an N-oxyl compound and (2) a compound selected from the group consisting of a bromide, an iodide and a mixture thereof, to produce oxidized cellulose;
   (C) defibrating and dispersing the oxidized cellulose to produce cellulose nanofibers, wherein acid hydrolysis treatment is not carried out between steps (A) and (B); and
   (D) performing a viscosity-reducing treatment of oxidized cellulose, between the steps (B) and (C), wherein the viscosity-reducing treatment is selected from the group consisting of ultraviolet irradiation, oxidative decomposition using hydrogen peroxide and ozone, hydrolysis with acid, hydrolysis with alkali, and combinations thereof.

2. The method of claim 1, wherein a concentration of the oxidized cellulose at the defibration and dispersion in the step (C) is 1 to 10% (w/v).

3. The method of claim 1, further comprising a step (E) of purifying the dissolving kraft pulp, between the steps (A) and (B), wherein the purification is selected from the group consisting of enzyme treatment, alkali treatment, treatment with oxidizing chemical, and combinations thereof.

4. The method of claim 1, wherein an amount of carboxyl groups in the oxidized cellulose is 1.0 mmol/g or greater based on a bone dry mass of the oxidized cellulose.

5. The method of claim 1, wherein the defibration and dispersion in the step (C) are performed under a pressure condition of 50 MPa or higher.

* * * * *